United States Patent
Zhang et al.

(10) Patent No.: US 12,026,866 B2
(45) Date of Patent: Jul. 2, 2024

(54) METHOD AND APPARATUS FOR RECHECKING DEFECTIVE PRODUCT

(71) Applicants: BOE Hyundai LCD Inc., Beijing (CN); BOE Technology Group Co., Ltd., Beijing (CN)

(72) Inventors: Shunan Zhang, Beijing (CN); Haifeng Sheng, Beijing (CN); Xuedong Zhang, Beijing (CN); Hao Su, Beijing (CN)

(73) Assignees: BOE Hyundai LCD Inc., Beijing (CN); BOE Technology Group Co., Ltd., Beijing (CN)

( * ) Notice: Subject to any disclaimer, the term of this patent is extended or adjusted under 35 U.S.C. 154(b) by 62 days.

(21) Appl. No.: 17/419,269

(22) PCT Filed: Dec. 29, 2020

(86) PCT No.: PCT/CN2020/141052
§ 371 (c)(1),
(2) Date: Jun. 28, 2021

(87) PCT Pub. No.: WO2021/169582
PCT Pub. Date: Sep. 2, 2021

(65) Prior Publication Data
US 2023/0073949 A1     Mar. 9, 2023

(30) Foreign Application Priority Data
Feb. 26, 2020   (CN) .......................... 202010118906.9

(51) Int. Cl.
*G06T 7/00*       (2017.01)
*G06F 3/14*       (2006.01)
(Continued)

(52) U.S. Cl.
CPC .............. *G06T 7/0008* (2013.01); *G06F 3/14* (2013.01); *G06T 7/60* (2013.01); *G06V 10/25* (2022.01);
(Continued)

(58) Field of Classification Search
CPC ....... G06T 7/0008; G06T 7/60; G06T 7/0004; G06T 2207/10024; G06T 2207/20164;
(Continued)

(56) References Cited

U.S. PATENT DOCUMENTS 10,578,894 B2 *   3/2020   Li ........................ G06T 7/0004
11,880,968 B2 *   1/2024   Li ........................... G06F 18/24
(Continued)

FOREIGN PATENT DOCUMENTS

CN   105845062 A   8/2016
CN   105976664 A   9/2016
(Continued)

OTHER PUBLICATIONS

CN202010118906.9 first office action.

*Primary Examiner* — Hoa Q Pham
(74) *Attorney, Agent, or Firm* — IPro, PLLC

(57) ABSTRACT

Provided are a method and an apparatus for rechecking a defective product. The method includes: a display terminal receives sent image information of at least one detection image corresponding to the defective product (S110). The image information includes: an ID of the at least one detection image, and defect information corresponding to the at least one detection image. The defect information includes: a defect type of a defect in the at least one detection image, and defect coordinates of the defect in the at least one detection image. The display terminal displays the at least one detection image that is pre-stored corresponding to the defective product and marks the defect information corre-
(Continued)

S121 — Determining identification coordinates of identification boxes to be displayed according to defect coordinates of defects in detection images S122 — Determining identification box types of the identification boxes to be displayed according to the detection images and defect types S123 — Displaying the identification boxes and positions of the defects on the detection images according to the defect coordinates, the identification coordinates and the identification box types sponding to the at least one detection image according to the image information (S120).

18 Claims, 12 Drawing Sheets

(51) Int. Cl.
*G06T 7/60* (2017.01)
*G06V 10/25* (2022.01)
*G06V 10/74* (2022.01)

(52) U.S. Cl.
CPC .. *G06V 10/761* (2022.01); *G06T 2207/10024* (2013.01); *G06T 2207/20164* (2013.01); *G06V 2201/07* (2022.01)

(58) Field of Classification Search
CPC .......... G06T 2207/30121; G06T 2207/30168; G06V 10/25; G06V 10/761; G06V 2201/07; G06F 3/14; G02F 1/13; G02F 1/13363; G09G 3/3406; H01L 2224/29075; H01L 27/3293; H01L 27/3244; H01L 27/1214; H01L 27/1225
USPC .......................................................... 382/141
See application file for complete search history.

(56) References Cited

U.S. PATENT DOCUMENTS

| | | | |
|---|---|---|---|
| 2019/0204629 A1 | 7/2019 | Li | |
| 2019/0385301 A1 | 12/2019 | Li et al. | |
| 2022/0207714 A1* | 6/2022 | Yang | G06N 3/045 |
| 2022/0245782 A1* | 8/2022 | Zhou | G06T 7/55 |

FOREIGN PATENT DOCUMENTS

| | | | | |
|---|---|---|---|---|
| CN | 107132233 | A | | 9/2017 |
| CN | 107564446 | A | | 1/2018 |
| CN | 110142230 | A | * | 8/2019 |
| CN | 111340781 | A | | 6/2020 |
| JP | 2007048868 | A | | 2/2007 |

* cited by examiner

METHOD AND APPARATUS FOR RECHECKING DEFECTIVE PRODUCT

CROSS-REFERENCES TO RELATED DISCLOSURE

The present disclosure is a National Stage of International Application No. PCT/CN2020/141052, filed on Dec. 29, 2020, which claims the priority to Chinese Patent Application No. 202010118906.9, filed with the China National Intellectual Property Administration on Feb. 26, 2020, the content of which are incorporated herein by reference in their entirety.

FIELD

The present disclosure relates to the field of detection technology, in particular to a method and an apparatus for rechecking a defective product.

BACKGROUND

With the development of the display technology, displays have been widely applied. General displays may include display modules. During the practical application, the display modules will be detected through a detection device after being produced. If it is determined that a display module is a defective product, a checker needs to recheck the defective product manually again to obtain a more accurate result. However, when the defective product is rechecked, since the checker may only obtain detection images in the defective product from a display terminal, the checker needs to recheck each detection image to determine defect types, defect positions and other information in each detection image, leading to high workload and low efficiency. In addition, there may be a risk that the checker fails to find defects detected by the detection device, leading to false detection for products, which even affects the quality of client products.

SUMMARY

A method for rechecking a defective product provided by an embodiment of the present disclosure, includes:
receiving, by a display terminal, image information of at least one detection image corresponding to the defective product; wherein the image information includes: an ID (identification) of the at least one detection image, and defect information corresponding to the at least one detection image, and the defect information includes: a defect type of a defect in the at least one detection image, and defect coordinates of the defect in the at least one detection image; and
according to the image information, displaying, by the display terminal, the at least one detection image that is pre-stored corresponding to the defective product and marking, by the display terminal, the defect information corresponding to the at least one detection image.

Optionally, in the embodiment of the present disclosure, the defective product corresponds to a plurality of detection images;
the image information further includes: a display order of the plurality of detection images, wherein one detection image corresponds to one defect total number, and the display order is that the IDs of the plurality of detection images are sequentially arranged according to the defect total numbers from high to low; and
the displaying the at least one detection image that is pre-stored corresponding to the defective product and marking the defect information corresponding to the at least one detection image includes:
according to the display order, sequentially displaying the detection images that are pre-stored corresponding to the defective product and marking the defect information corresponding to the detection images.

Optionally, in the embodiment of the present disclosure, wherein the marking the defect information corresponding to the detection images, includes:
determining identification coordinates of identification boxes to be displayed according to defect coordinates of defects in the detection images;
determining identification box types of the identification boxes to be displayed according to the detection images and the defect types; and
displaying the identification boxes and positions of the defects on the detection images according to the defect coordinates, the identification coordinates and the identification box types, wherein the identification boxes surround the positions of the defects.

Optionally, in the embodiment of the present disclosure, in the condition that displaying the identification boxes and the positions of the defects on the detection images according to the defect coordinates, the identification coordinates and the identification box types, displaying the defect types of the defects around the positions of the defects according to the defect types.

Optionally, in the embodiment of the present disclosure, the defect information also includes: an initial width W0 and an initial height H0 of each of the defects, wherein the initial width is a maximum distance of a region of the defect in a display image of the defective product in a first direction, the initial height is a maximum distance of the region of the defect in the display image of the defective product in a second direction, and the first direction and the second direction are different; and
the identification boxes are rectangular, identification coordinates of four vertexes of one of the identification boxes are: (x1, y1), (x1, y2), (x2, y2) and (x2, y1), and the defect coordinates are (x0, y0), wherein $$x1 = x0 - \frac{W0}{2}, y1 = y0 + \frac{H0}{2}, x2 = x0 + \frac{W0}{2} \text{ and } y2 = y0 - \frac{H0}{2}.$$

Optionally, in the embodiment of the present disclosure, the determining the identification box types of the identification boxes according to the detection images and the defect types, includes:
determining patterns of lines of the identification boxes to be displayed according to the defect types;
selecting identification box colors with color differences, that are greater than a difference threshold, with that of the detection images; and
using the patterns of the lines and the identification box colors as the identification box types.

Optionally, in the embodiment of the present disclosure, before the displaying the identification boxes and the positions of the defects on the detection images, the method further includes: determining a target defect type in the defect types of the defects in the detection images; and
the displaying the identification boxes and the positions of the defects on the detection images includes: displaying an identification box corresponding to the target defect type and a position of the target defect type on each of the detection images.

Optionally, in the embodiment of the present disclosure, the plurality of detection images corresponding to the defective product are different in gray scale.

An embodiment of the present disclosure further provides a method for rechecking a defective product, including:
  receiving, by an execution circuit, an image information request of the defective product;
  acquiring, by the execution circuit, image information of at least one detection image corresponding to the defective product according to the image information request, wherein the image information includes: an ID (identification) of the at least one detection image and defect information corresponding to the at least one detection image, and the defect information includes: a defect type of a defect in the at least one detection image and defect coordinates of the defect in the at least one detection image; and
  sending the acquired image information to a display terminal.

Optionally, in the embodiment of the present disclosure, the defective product correspond to a plurality of detection images; and
  the acquiring, by the execution circuit, the image information of the plurality of detection images corresponding to the defective product according to the image information request, includes:
  taking, by the execution circuit, image information of the plurality of detection images corresponding to the defective product from a database according to the image information request;
  determining, by the execution circuit, a defect total number corresponding to each of the plurality of detection images;
  sequentially arranging, by the execution circuit, IDs of the plurality of detection images according to an order of the defect total numbers from high to low so as to determine a display order of the plurality of detection images; and
  sending the image information including the display order to the display terminal.

An embodiment of the present disclosure further provides a display terminal, including a display, a first memory, a first processor and a computer program stored on the first memory and capable of running on the first processor, wherein when executing the computer program, the first processor implements the above method for rechecking the defective product.

An embodiment of the present disclosure further provides an execution circuit, including a second memory, a second processor and a computer program stored on the second memory and capable of running on the second processor, wherein when executing the computer program, the second processor implements the above method for rechecking the defective product.

An embodiment of the present disclosure further provides a detection apparatus, including: a detection device, an execution circuit, a file server and a display terminal, wherein
  the detection device is connected with the execution circuit and the file server; and the detection device is configured to perform image detection on a product; transmit a detected detection image and image-related information to the file server for storage, and transmit an ID of the product, a defect code, position information of a defect and an ID of the detection image to the execution circuit for storage;
  the file server is configured to store the information sent by the detection device;
  the execution circuit is configured to store the information sent by the detection device, receive an image information request of a defective product, acquire image information of a detection image corresponding to the defective product according to the image information request, and send the acquired image information to the display terminal; wherein the image information includes: an ID of the detection image and defect information corresponding to the detection image; and
  the display terminal is configured to receive the image information of the detection image corresponding to the defective product sent by the execution circuit; and display the detection image that is pre-stored corresponding to the defective product and mark the defect information corresponding to the detection image according to the image information.

An embodiment of the present disclosure further provides a computer readable storage medium, on which a computer program is stored, wherein when executed by a processor, the computer program implements the above method for rechecking the defective product.

DETAILED DESCRIPTION OF THE EMBODIMENTS

Figure 1A:
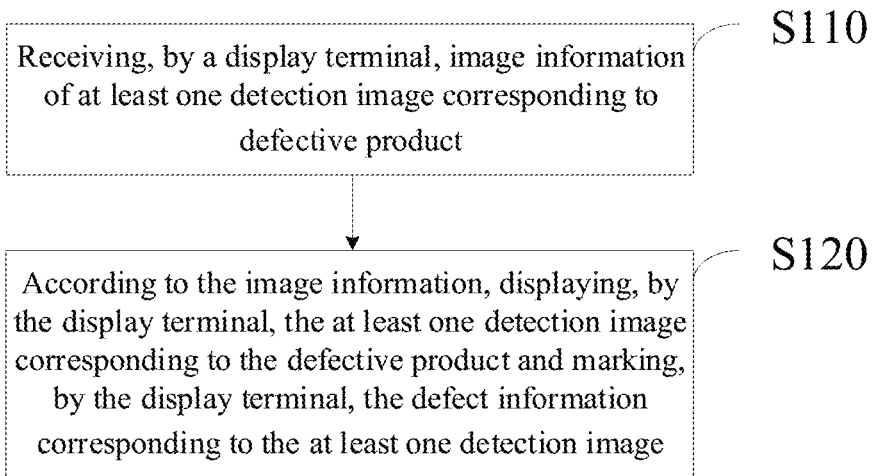
FIG. 1A is a flowchart of a method for rechecking a defective product in an embodiment of the present disclosure.

In order to make the objectives, technical solutions and advantages of embodiments of the present disclosure clearer, the technical solutions of the embodiments of the present disclosure will be described clearly and completely below with reference to the drawings of the embodiments of the present disclosure. Obviously, the described embodiments are some embodiments of the present disclosure, but not all embodiments. In addition, the embodiments of the present disclosure and the features in the embodiments can be combined with each other without conflict. Based on the described embodiments of the present disclosure, all other embodiments obtained by those of ordinary skill in the art without creative labor belong to the scope of protection of the present disclosure.

Unless otherwise defined, the technical terms or scientific terms used in the present disclosure shall have the general meaning understood by those with general skills in the field to which the present disclosure belongs. As used in the present disclosure, similar words such as "comprise" or "include" mean that the elements or objects appearing before the word cover the listed elements or objects appearing after the word and their equivalents, and other elements or objects are not excluded. Similar words such as "connect" or "couple" are not limited to physical or mechanical connection, but can include electrical connection, whether direct or indirect. "Inner", "outer", "upper", "lower" and so on are only used to express the relative positional relationship. If the absolute position of a described object is changed, the relative positional relationship may change accordingly.

It should be noted that the size and shape of each figure in the drawings do not reflect the true scale, and the purpose is only to schematically illustrate the content of the present disclosure. In addition, the same or similar reference numerals refer to the same or similar elements or elements having the same or similar functions throughout.

A method for rechecking a defective product provided by an embodiment of the present disclosure, as shown in FIG. 1A, may include the following steps.

S110, a display terminal receives image information of at least one detection image corresponding to the defective product. The image information includes: IDs (identifications) of the at least one detection image, and defect information corresponding to the at least one detection image. The defect information includes: a defect type of a defect in the at least one detection image, and defect coordinates of the defect in the at least one detection image.

S120, the display terminal, according to the image information, displays the at least one detection image that are pre-stored corresponding to the defective product and marks the defect information corresponding to the at least one detection image.

According to the method for rechecking the defective product provided by the embodiment of the present disclosure, the display terminal and an execution circuit perform data interaction, so that a server may send the image information of the detection images corresponding to the defective product to the display terminal, so as to make the display terminal display the detection images that are pre-stored corresponding to the defective product and mark the defect information corresponding to the detection images according to the image information. Therefore, not only can a checker performing rechecking directly see the detection images on the display terminal, but also the checker can visually see the defects on the detection images. The checker can directly determine the defects in the detection images without additionally checking the detection images. Thus, the workload of the checker can be lowered, efficiency can be improved, and detection accuracy can be improved.

Figure 1B:
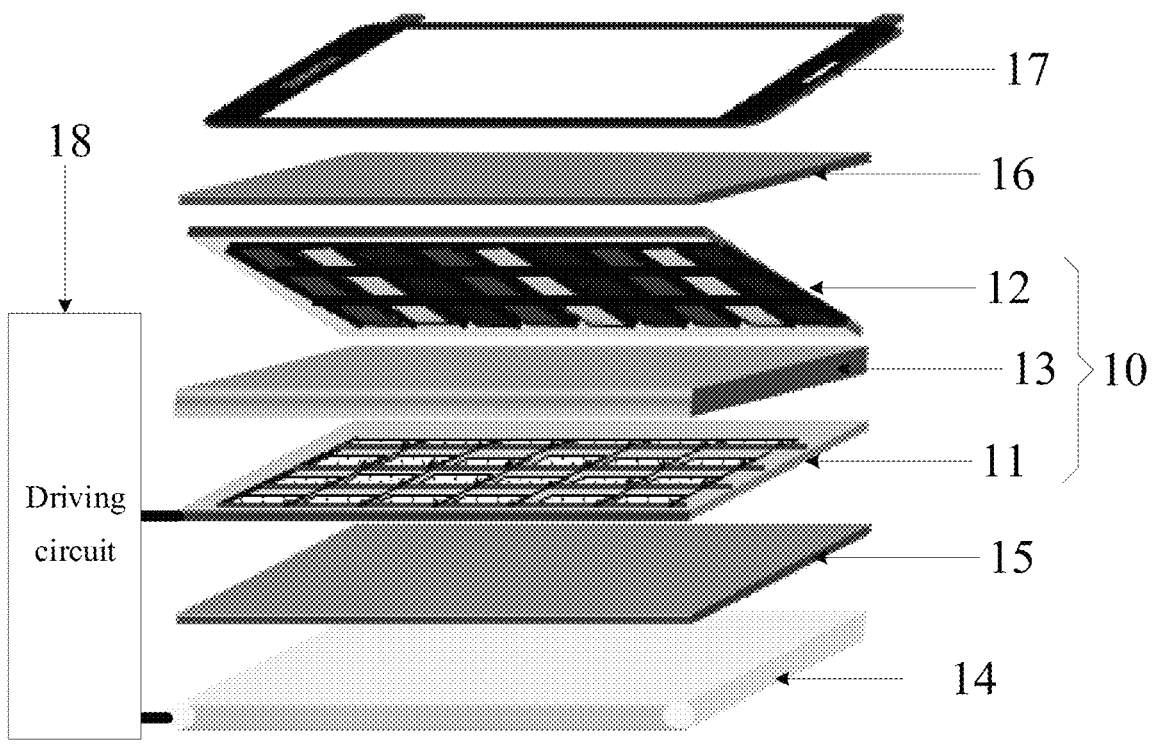
FIG. 1B is a schematic structural diagram of a display module in an embodiment of the present disclosure.

As shown in FIG. 1B, a display module may include: a display panel 10, a backlight module 14 on a backlight side of the display panel 10, a first polarizer 15 between the display panel 10 and the backlight module 14, a second polarizer 16 on a side of the display panel 10 away from the backlight module 14, a protective cover plate 17 on a side of the second polarizer 16 away from the display panel 10, and a driving circuit 18. The display panel 10 may include an array substrate 11 and a color film substrate 12 which are oppositely disposed, and a liquid crystal layer 13 between the array substrate 11 and the color film substrate 12. The backlight module 14 may be a side-entry type or direct type backlight module. In a practical preparation process, the display panel and the backlight module are prepared respectively. When the display panel is prepared, the display panel 10 is formed by respectively preparing the array substrate 11 and the color film substrate 12 and then packaging liquid crystals and performing alignment. Afterwards, the first polarizer 15 is disposed on a side of the array substrate 11 away from the color film substrate 12, and the second polarizer 16 is disposed on a side of the color film substrate 12 away from the array substrate 11. The display panel, the backlight module 14, the driving circuit 18 and the protective cover plate 17 are assembled to form the display module. It needs to be noted that the display panel may include a plurality of pixel units, and each pixel unit may include a plurality of sub pixels. For example, each pixel unit may include: a red sub pixel, a green sub pixel and a blue sub pixel. Therefore, red, green and blue may be mixed to realize color display.

During the practical application, after the display module is prepared, there may be problems such as poor image display (e.g., displayed images may have dot defects, line defects, non-uniform display (such as Mura) or other defects). Based on this, an automated optical inspection (AOI) device is usually adopted to perform image detection on the display panel in the display module. In the image detection process, the display panel is generally driven to display reference images. When the reference images are displayed by the display panel, the displayed images are photographed to obtain and store images. Generally, the AOI device may automatically determine the detected display module as a good product or defective product through the detected images. If it is determined that the display module is the defective product, the defect information such as the defect types and the defect coordinates of the defects in the images may be stored or sent to a file server to be stored. During specific implementation, the defective product provided by the embodiment of the present disclosure may be defective product, determined by the AOI device, in display modules, that is, the defective product provided by the embodiment of the present disclosure may be display modules having defects.

Generally, there are many types of defects detected by the AOI device, such as a dot defect, a line defect, non-uniform display (such as Mura) or other defect. The dot defect may include: a white dot defect, a black dot defect and a bright dot defect. Moreover, these defect types have corresponding defect codes when stored. The defect codes corresponding to these defect types are as shown in Table 1.

TABLE 1

| Defect types | White dot defect | Black dot defect | Bright dot defect | Line defect | Mura | Other defect |
|---|---|---|---|---|---|---|
| Defect codes | 11 | 12 | 13 | 20 | 30 | 40 |

As for the gray scale, a brightness variation range between the most darkness and the most brightness are generally divided into a plurality of parts, so as to facilitate screen brightness control. Generally, each pixel of the display panel in the display module is usually composed of a red sub pixel, a green sub pixel and a blue sub pixel and may present many different colors, and light emitted by each sub pixel may display different brightness levels. The gray scale represents different brightness levels between the most darkness and the most brightness. The more the levels therebetween, the finer the presented image effect. Generally, the display module adopts a 6 bit panel or an 8 bit panel to realize image display. The 8 bit panel can show $2^8$ brightness levels, and the panel may have 256 gray scales, namely 0 to 255 gray scales. The 6 bit panel can show $2^6$ brightness levels, and the panel may have 64 gray scales, namely 0 to 63 gray scales. The following is explained with the 8 bit panel.

Figure 2A:
FIG. 2A to FIG. 2G are schematic diagrams of reference images in an embodiment of the present disclosure respectively.

Exemplarily, there may be at least one reference image. For example, the quantity of reference images may be set to be 1 or 3 or 7 or more, which may be designed and determined according to actual application environments and is not limited here. Exemplarily, as shown in FIG. 2A to FIG. 2G, 7 reference images may be set. As shown in FIG. 2A, one reference image may be set as a totally white image. For example, the red sub pixels, the green sub pixels and the blue sub pixels may all display the brightness of 255 gray scales, so that a display panel needing to be detected is made to display the totally white image. Therefore, display uniformity of the display panel may be detected.

Figure 2B:
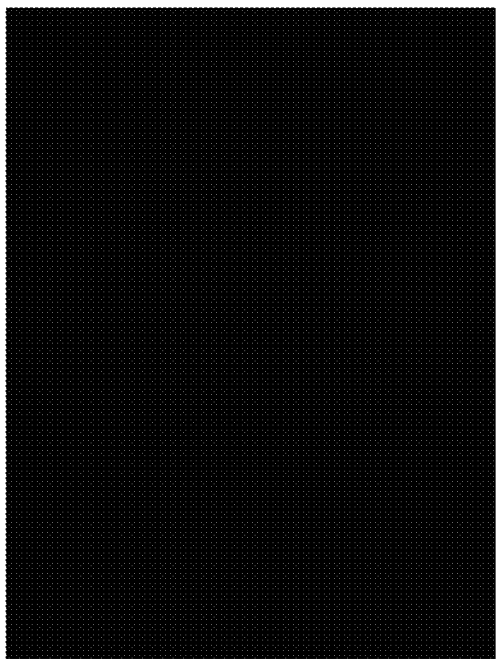

As shown in FIG. 2B, one reference image may be set as a totally black image. For example, the red sub pixels, the green sub pixels and the blue sub pixels may all display the brightness of the 0 gray scale, so that a display module needing to be detected is made to display the totally black image. Therefore, foreign matter in the display panel may be detected.

Figure 2C:
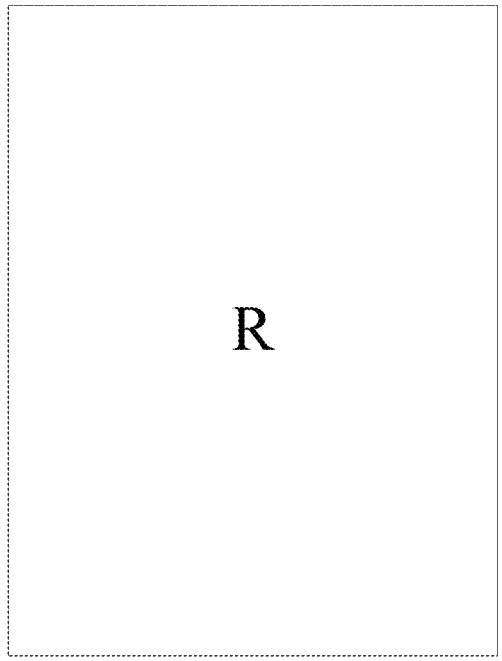

As shown in FIG. 2C, one reference image may be set as a red image R. For example, the red sub pixels may display the brightness of 127 gray scales, and the green sub pixels and the blue sub pixels may both display the brightness of the 0 gray scale, so that a display module needing to be detected is made to display the red image, namely single-color image detection is carried out. Therefore, the display panel may be detected when the red sub pixels light up alone. It needs to be noted that FIG. 2C is only for illustration, and is not an image which the display module is actually driven to display.

Figure 2D:
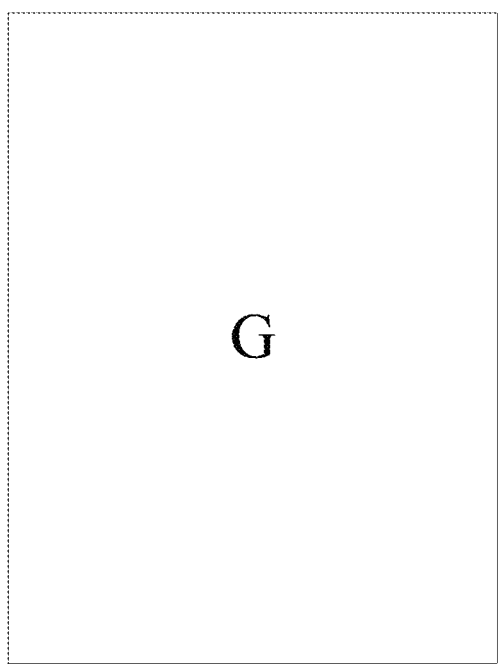

As shown in FIG. 2D, one reference image may be set as a green image G. For example, the green sub pixels may display the brightness of 127 gray scales, and the red sub pixels and the blue sub pixels may both display the brightness of the 0 gray scale, so that a display module needing to be detected is made to display the green image, namely single-color image detection is carried out. Therefore, the display panel may be detected when the green sub pixels light up alone. It needs to be noted that FIG. 2D is only for illustration, and is not an image which the display module is actually driven to display.

Figure 2E:
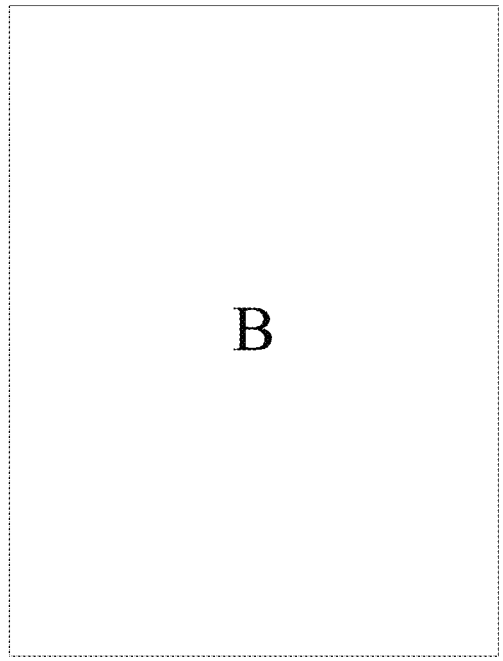

As shown in FIG. 2E, one reference image may be set as a blue image B. For example, the blue sub pixels may display the brightness of 127 gray scales, and the red sub pixels and the green sub pixels may both display the brightness of the 0 gray scale, so that a display module needing to be detected is made to display the blue image, namely single-color image detection is carried out. Therefore, the display panel may be detected when the blue sub pixels light up alone. It needs to be noted that FIG. 2E is only for illustration, and is not an image which the display module is actually driven to display.

Figure 2F:

As shown in FIG. 2F, one reference image may be set as a color image. For example, the red sub pixels, the green sub pixels and the blue sub pixels may respectively display the brightness of corresponding the color image, so that a display module needing to be detected is made to display the color image. Therefore, display uniformity of the display panel may be detected. It needs to be noted that FIG. 2F is only for illustration, and is not an image which the display module is actually driven to display.

Figure 2G:
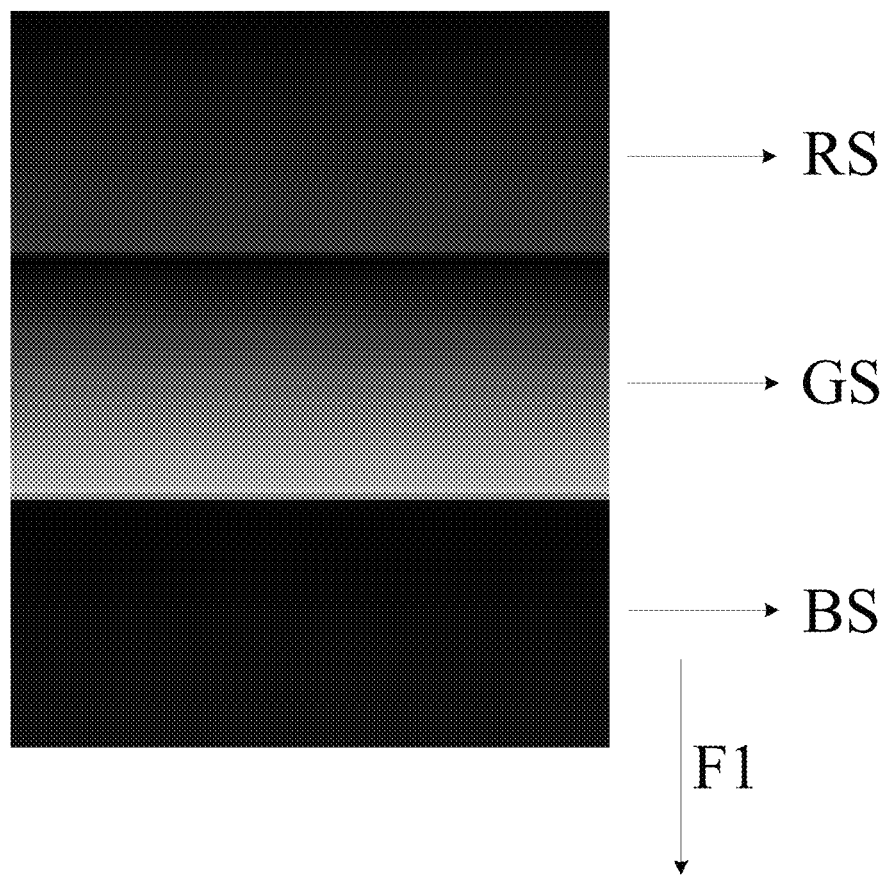

As shown in FIG. 2G, one reference image may be set as a striped image. For example, in a direction of an arrow F1, a display region of the display module may be divided into 3 regions: a red display region RS, a green display region GS and a blue display region BS. In the red display region RS, the green sub pixels and the blue sub pixels both display the brightness of the 0 gray scale. In the direction of the arrow F1, the red sub pixels may sequentially display the brightness from 0 to 255 gray scales. In the green display region GS, the red sub pixels and the blue sub pixels both display the brightness of the 0 gray scale. In the direction of the arrow F1, the green sub pixels may sequentially display the brightness from 0 to 255 gray scales. In the blue display region BS, the red sub pixels and the green sub pixels both display the brightness of the 0 gray scale. In the direction of the arrow F1, the blue sub pixels may sequentially display the brightness from 0 to 255 gray scales. Therefore, the display uniformity of the display panel may be detected. It needs to be noted that FIG. 2G is only for illustration, and is not an image which the display module is actually driven to display.

During specific implementation, in the embodiment of the present disclosure, an ID will be set in each prepared display module. During detection by the AOI device, the ID of the display module and a detection image corresponding to the display module are stored in a correlated mode, so that the corresponding detection image and the defect information may be found through the ID of the display module subsequently. Moreover, each detection image also has its corresponding ID. For example, when the display module is driven to display the reference image shown in FIG. 2A, the ID corresponding to the obtained detection image may be L255. When the display module is driven to display the reference image shown in FIG. 2B, the ID corresponding to the obtained detection image may be L0. When the display module is driven to display the reference image shown in FIG. 2C, the ID corresponding to the obtained detection image may be LR. When the display module is driven to display the reference image shown in FIG. 2D, the ID corresponding to the obtained detection image may be LG. When the display module is driven to display the reference image shown in FIG. 2E, the ID corresponding to the obtained detection image may be LB. When the display module is driven to display the reference image shown in FIG. 2F, the ID corresponding to the obtained detection image may be LS. When the display module is driven to display the reference image shown in FIG. 2G, the ID corresponding to the obtained detection image may be LRGB.

During specific implementation, in the embodiment of the present disclosure, the detection images corresponding to the defective product may be images obtained by photographing the above images. Moreover, during specific implementation, in the embodiment of the present disclosure, one defective product may correspond to multiple detection images. Exemplarily, the multiple detection images corresponding to one defective product may be different in gray scale. For example, after one display module is driven to respectively display the reference images of FIG. 2A to FIG. 2G, 7 detection images corresponding to the display module may be obtained. Besides, the 7 detection images are respectively named as L255, L0, LR, LG, LB, LS and LRGB for storage.

It needs to be noted that the multiple detection images being different in gray scale in the embodiment of the present disclosure may mean that two of the detection images are not completely the same in gray scale. For example, the gray scale of the detection image L255 is 255, the gray scale of the detection image L0 is 0, and these two detection images are different in gray scale. The gray scale of the detection image LR is 127, and the gray scales of the red display region RS in the detection image LRGB changes sequentially from 0 to 255, that is, the gray scales 0 to 126 and the gray scales 128 to 255 in the red display region RS are different from the gray scale of the detection image LR.

During specific implementation, in the embodiment of the present disclosure, the image information may further include: a display order of the multiple detection images. One detection image corresponds to one defect total number, and the display order is that the IDs of the multiple detection images are sequentially arranged according to the defect total numbers from high to low. For example, if the detection image L0 has the highest defect total number and the detection image LRGB has the lowest defect total number, the display order of the 7 detection images corresponding to one defective product may be set as: L0, LS, LRGB, L255, LR, LG and LB. Moreover, the IDs of the 7 detection images and their display order have corresponding order codes, so that the IDs of the 7 detection images are sorted through the order codes. The order codes corresponding to the IDs of the 7 detection images and their display order are as shown in Table 2.

TABLE 2

| IDs of detection images | L0 | LS | LRGB | L255 | LR | LG | LB |
|---|---|---|---|---|---|---|---|
| Order codes | 01 | 02 | 03 | 04 | 05 | 06 | 07 |

During specific implementation, in the embodiment of the present disclosure, displaying the detection images that are pre-stored corresponding to the defective product and marking the defect information corresponding to the detection images, may include: according to the display order, the detection images that are pre-stored corresponding to the defective product are sequentially displayed and the defect information corresponding to the detection images is sequentially marked.

Exemplarily, the display terminal may preferentially display the detection image L0 with the order code of 01 according to the display order; then, it may be switched to the detection image LS with the order code of 02; and afterwards, it may be switched to the detection image LRGB with the order code of 03, and so on, which is not repeated here. Therefore, the display order of the detection images is obtained according to the defect total numbers, and the detection images with the relatively high defect total numbers are disposed front, which is conductive to finding the defects in the display module as soon as possible. Moreover, considering energy of the checker, the detection images with the relatively high defect total numbers are disposed at front positions, so that the detection time of the checker may be further saved, and the capacity to find out the defects is improved.

Figure 3:
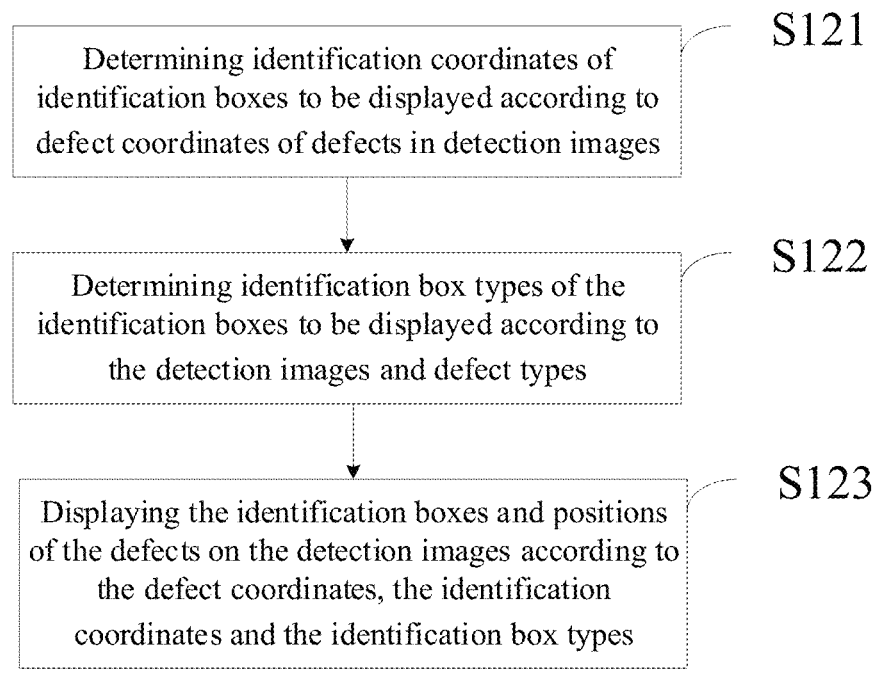
FIG. 3 is a flowchart of another method for rechecking a defective product in an embodiment of the present disclosure.

During specific implementation, in the embodiment of the present disclosure, as shown in FIG. 3, marking the defect information corresponding to the detection images, may include the following steps.

S121, identification coordinates of identification boxes to be displayed are determined according to the defect coordinates of the defects in the detection images.

S122, identification box types of the identification boxes to be displayed are determined according to the detection images and the defect types.

S123, the identification boxes and the positions of the defects are displayed on the detection images according to the defect coordinates, the identification coordinates and the identification box types, wherein the identification boxes surround the positions of the defects.

It needs to be noted that through steps S121 to S123, the identification boxes may be adopted to mark the positions of the defects, so that the checker can more obviously see the positions of the defects, which further lowers the workload of the checker and improves efficiency and detection accuracy.

Further, during specific implementation, step S123 that the identification boxes and the positions of the defects are displayed on the detection images according to the defect coordinates, the identification coordinates and the identification box types, may further include: the defect types of the defects are displayed around the positions of the defects according to the defect types. Therefore, the checker may directly see the defect types, which further lowers the workload of the checker and improves efficiency and detection accuracy.

Figure 4:
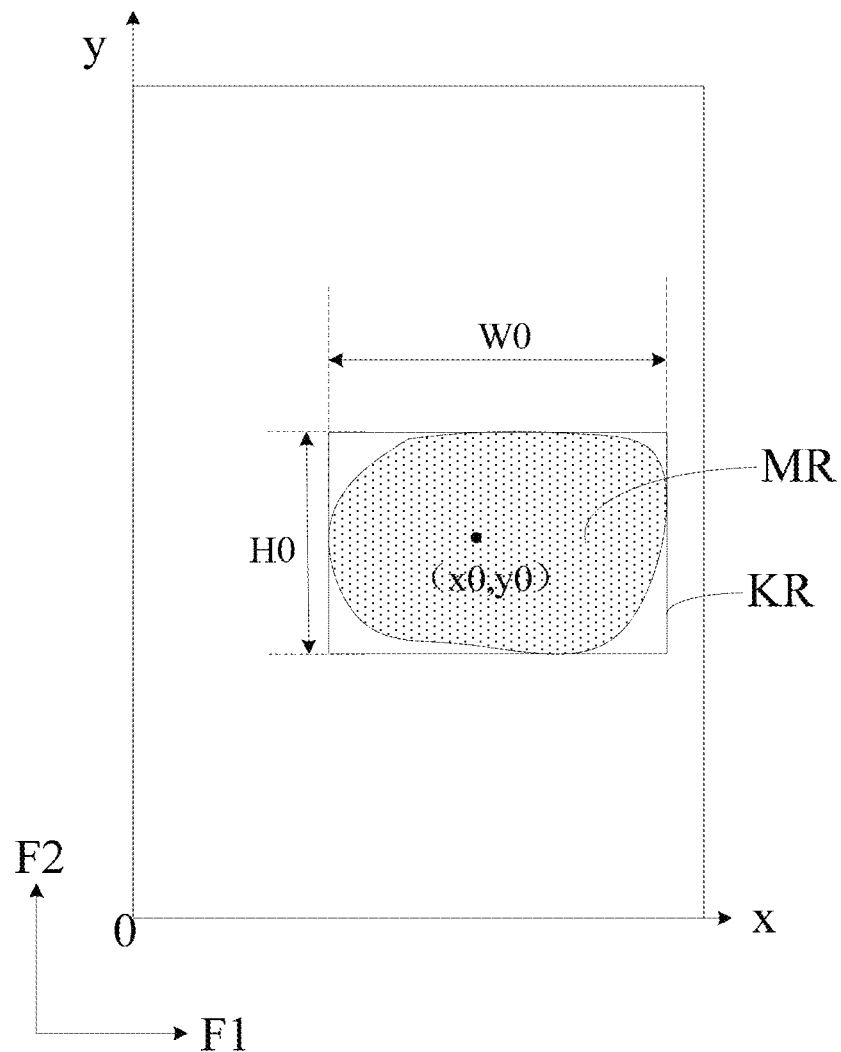
FIG. 4 is a schematic diagram of a detection image in an embodiment of the present disclosure.

During the practical application, the defects in the images displayed by the display module may be regional, for example, the Mura defects are regional during the practical application. During specific implementation, in the embodiment of the present disclosure, the defect coordinates may be coordinates of a center point A0 of a region where a defect is located. Exemplarily, as shown in FIG. 4, a rectangular coordinate system is set, with an origin 0 located at the lower left corner of the detection image, an x axis that is parallel to a first direction F1 and a y axis that is parallel to a second direction F2. A region MR where the defect is located may be an irregular region. The irregular region has a rectangular box KR tangent thereto, so coordinates (x0, y1) of a center point of the rectangular box KR in the rectangular coordinate system may serve as coordinates of a center point of the region MR. Alternatively, the region where the defect is located may also be a regular region, so coordinates of a center point of the regular region in the rectangular coordinate system may serve as coordinates of a center point of the region where the defect is located.

During specific implementation, in the embodiment of the present disclosure, the defect information may also include: an initial width W0 and an initial height H0 of a defect. As shown in FIG. 4, the initial width W0 is a maximum distance of the region MR of the defect in the display image of the defective product in the first direction F1, and the initial height H0 is a maximum distance of the region MR of the defect in the display image of the defective product in the second direction F2, wherein the first direction F1 and the second direction F2 are different. The first direction may be a row direction of the pixel units, and the second direction may be a column direction of the pixel units.

During specific implementation, in the embodiment of the present disclosure, an identification box BK may be set to be rectangular, identification coordinates of four vertexes of the identification box are: (x1, y1), (x1, y2), (x2, y2) and (x2, y1), and the defect coordinates are (x0, y0), wherein $$x1 = x0 - \frac{W0}{2}, y1 = y0 + \frac{H0}{2}, x2 = x0 + \frac{W0}{2} \text{ and } y2 = y0 - \frac{H0}{2}.$$

Figure 5:
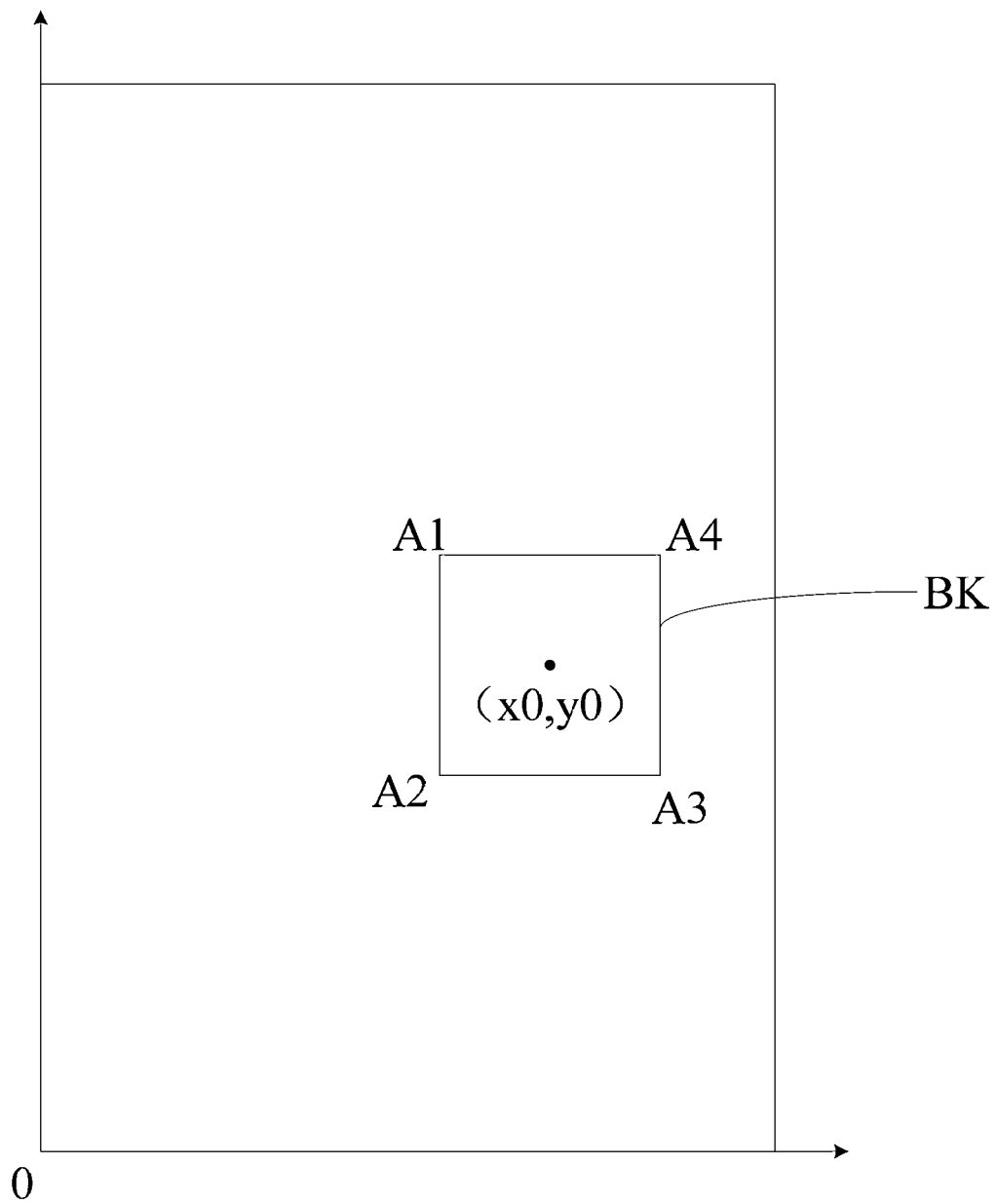
FIG. 5 is a schematic diagram of another detection image in an embodiment of the present disclosure.

In combination with FIG. 5, the defect coordinates are (x0, y0) (e.g., a position of a black dot), and the four vertexes of the identification box are A1, A2, A3 and A4, respectively. The coordinates of A1 are (x1, y1), the coordinates of A2 are (x1, y2), the coordinates of A3 are (x2, y2) and the coordinates of A4 are (x2, y1). According to $$x1 = x0 - \frac{W0}{2}, y1 = y0 + \frac{H0}{2}, x2 = x0 + \frac{W0}{2} \text{ and } y2 = y0 - \frac{H0}{2},$$

values of x1, x2, y1 and y2 may be worked out, and then according to (x1, y1), (x1, y2), (x2, y2) and (x2, y1), the identification box BK may be displayed, so that the defect coordinates may be obviously identified by the identification box.

During specific implementation, in the embodiment of the present disclosure, determining the identification box types of the identification boxes according to the detection images and the defect types, may include:

patterns of lines of the identification boxes to be displayed are determined according to the defect types;

identification box colors with color differences, that are greater than a difference threshold, with colors of the detection images are selected; and the patterns of the lines and the identification box colors are used as the identification box types.

Since each defect is marked through one identification box, if there are many defects on a single detection image, these identification boxes may shield actual defects, thereby affecting rechecking by the checker. In view of this, during specific implementation, before the identification boxes and the positions of the defects are displayed on the detection images, the method may further include: a target defect type is determined in the defect types of the defects in the detection images. In the embodiment of the present disclosure, displaying the identification boxes and the positions of the defects on the detection images may include: an identification box corresponding to the target defect type and a position of the target defect type are displayed on the detection image.

Therefore, defect coordinates corresponding to only some defect types may be marked through the identification boxes, while the identification boxes corresponding to other defect types are hidden, so that the identification boxes may be prevented from shielding the actual defects. Further, the workload of the checker is lowered, and efficiency and detection accuracy are improved. Moreover, the identification boxes corresponding to which defect types are hidden and the identification boxes corresponding to which defect types are displayed may be determined according to actual recheck operation requirements of the checker. For example, the AOI device has self-sensitiveness, the sensitiveness is high when certain defects (such as line defects and Mura) are detected and is low when certain defects (such as brightness dot defects) are detected, and thus when the checker rechecks, the defects for which the AOI device has the low detection sensitiveness may be rechecked, while the defects for which the AOI device has the high sensitiveness may not be rechecked anymore. Therefore, the defects for which the AOI device has the low detection sensitiveness may be used as target defect types.

Of course, the identification boxes in one detection image may also be all displayed or all hidden.

An embodiment of the present disclosure provides a method for rechecking a defective product, which may include the following steps.

S210, an execution circuit receives an image information request of the defective product.

S220, the execution circuit acquires image information of at least one detection image corresponding to the defective product according to the image information request. The image information includes: an ID of the at least one detection image and defect information corresponding to the at least one detection image. The defect information includes: a defect type of a defect in the at least one detection image and defect coordinates of the defect in the at least one detection image.

S230, the acquired image information is sent to a display terminal.

In the method for rechecking the defective product provided by the embodiment of the present disclosure, after the execution circuit receives the image information request of the defective product, the image information of the detection image corresponding to the defective product may be acquired. Then, the acquired image information of the detection image may be sent to the display terminal through data interaction between the display terminal and the execution circuit, so that the display terminal displays the detection image that is pre-stored corresponding to the defective product and marks the defect information corresponding to the detection image according to the image information. Therefore, not only the checker rechecking can directly see the detection image on the display terminal, but also the checker can visually see the defects on the detection image. The checker can directly determine the defect in the detection image without additionally checking the detection image. Thus, the workload of the checker can be lowered, efficiency can be improved, and detection accuracy can be improved.

During specific implementation, the defective product corresponds to a plurality of detection images. In the embodiment of the present disclosure, the execution circuit acquiring the image information of the detection images corresponding to the defective product according to the image information request, may include:

the execution circuit takes image information of the plurality of detection images corresponding to the defective product from a database according to the image information request;

the execution circuit determines a defect total number corresponding to each detection image;

the execution circuit sequentially arranges IDs of the plurality of detection images according to an order of the defect total numbers from high to low so as to determine a display order of the plurality of detection images; and the image information including the display order is sent to the display terminal.

Therefore, the display order of the detection images is sorted according to the defect total numbers, and the detection images with the relatively high defect total numbers are disposed front, which is conductive to finding out the defects in a display module as soon as possible. Moreover, considering energy of the checker, the detection images with the relatively high defect total numbers are disposed at front positions, so that the detection time of the checker may be further saved when the display order is sent to the display terminal, and the capacity of detecting the defects is improved.

Based on the same inventive concept, an embodiment of the present disclosure further provides a display terminal, including a display, a first memory, a first processor and a computer program stored on the first memory and capable of running on the first processor, wherein when executing the program, the first processor implements the above method for rechecking the defective product.

Based on the same inventive concept, an embodiment of the present disclosure further provides an execution circuit, including a second memory, a second processor and a computer program stored on the second memory and capable of running on the second processor, wherein when executing the program, the second processor implements the above method for rechecking the defective product.

Based on the same inventive concept, an embodiment of the present disclosure further provides a computer readable storage medium on which a computer program is stored, and when executed by a processor, the computer program implements the above method for rechecking the defective product provided by the embodiments of the present disclosure. Exemplarily, the present disclosure may take the form of a computer program product implemented on one or more computer readable storage media (including, but not limited to, a disk memory, an optical memory, etc.) in which computer readable program codes are contained.

Those skilled in the art shall appreciate that the embodiments of the present disclosure may be provided as methods, systems, or computer program products. Therefore, the present disclosure may take the form of a full hardware embodiment, a full software embodiment, or an embodiment combining software and hardware aspects. Moreover, the present disclosure may take the form of a computer program product implemented on one or more computer readable storage media containing computer readable program codes. The computer readable storage media include volatile and non-volatile, removable and non-removable media implemented in any method or technique for storing information, such as computer readable instructions, data structures, program modules, or other data. The computer storage media include but not limited to a RAM, a ROM, an EEPROM, a flash memory or other memory technology, a CD-ROM, a digital versatile disc (DVD) or other optical disk storage, magnetic cassettes, magnetic tapes, magnetic disk storage or other magnetic storage apparatuses, or any other media that can be used to store desired information and can be accessed by computers.

The present disclosure is described with reference to flow charts and/or block diagrams of methods, devices (systems) and computer program products in accordance with the embodiments of the present disclosure. It should be understood that each flow and/or block in the flow charts and/or block diagrams and the combination of the flow and/or block in the flow charts and/or block diagrams can be implemented by computer program instructions. These computer program instructions can be provided to general-purpose computers, special-purpose computers, embedded processors or processors of other programmable data processing devices to generate a machine, so that instructions executed by processors of a computer or other programmable data processing devices generate apparatuses for implementing functions specified in one or more flows of flow charts and/or one or more blocks of block diagrams.

These computer program instructions may also be stored in a computer-readable memory capable of guiding a computer or other programmable data processing devices to operate in a specific manner such that instructions stored in the computer-readable memory produce a product including an instruction apparatus, and the instruction apparatus realizes the functions specified in one or more flows of flow charts and/or one or more blocks of block diagrams.

These computer program instructions can also be loaded on a computer or other programmable data processing devices, so that a series of operation steps can be performed on the computer or other programmable devices to produce computer-implemented processing, and thus, instructions executed on the computer or other programmable devices provide steps for implementing functions specified in one or more flows of flow charts and/or one or more blocks of block diagrams.

Figure 6:
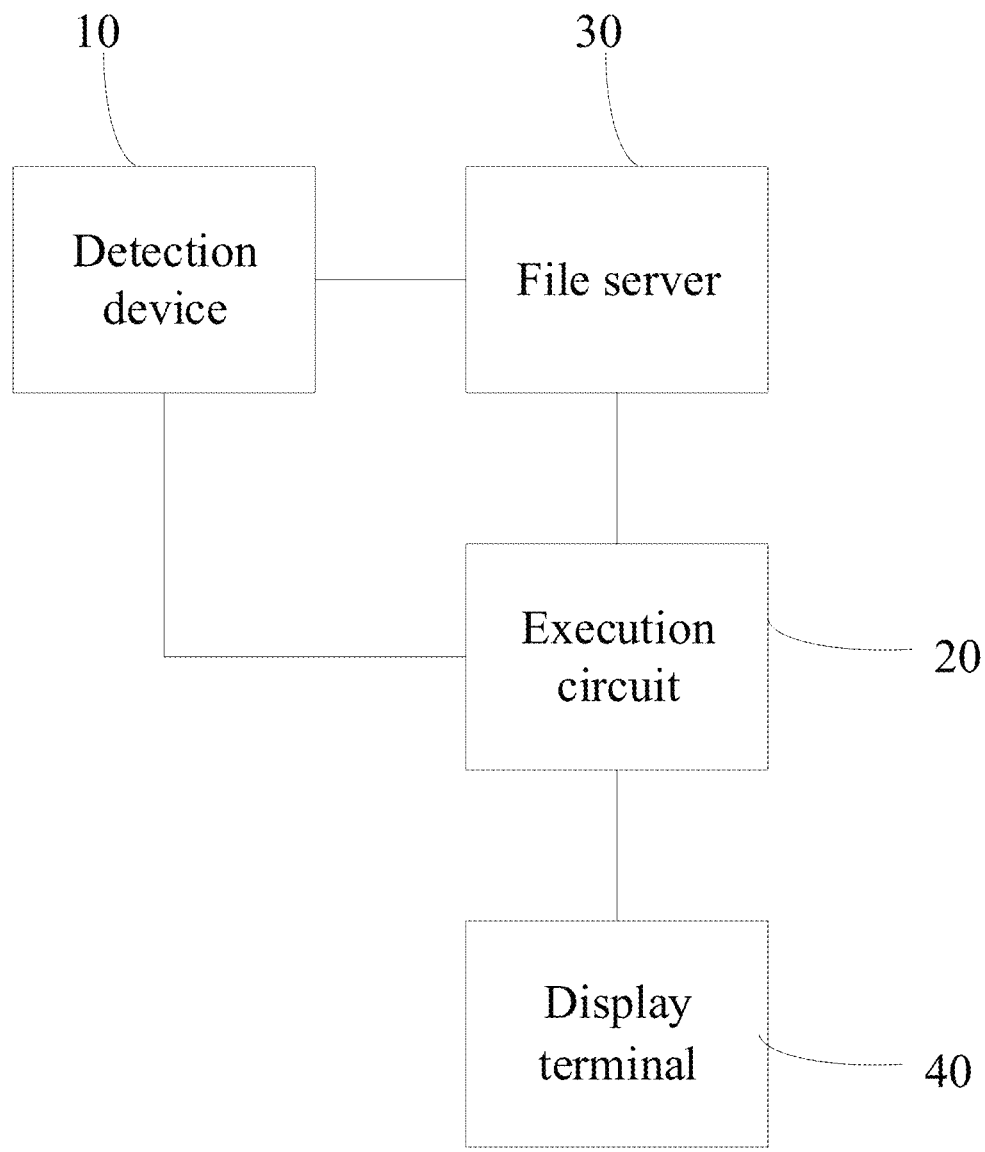
FIG. 6 is a schematic structural diagram of a detection apparatus in an embodiment of the present disclosure.

Based on the same inventive concept, an embodiment of the present disclosure further provides a detection apparatus. As shown in FIG. 6, the detection apparatus may include: a detection device 10, an execution circuit 20, a file server 30 and a display terminal 40.

The detection device 10 is connected with the execution circuit and the file server. The detection device is configured to perform image detection on a product to obtain a detection image; determine the product as a defective product according to the detection image; and transmit the detection image corresponding to the determined defective product and image-related information to the file server for storage, and transmit an ID of the determined defective product, a defect code, position information of a defect and an ID of the detection image to the execution circuit for storage.

The file server 30 is configured to store the information sent by the detection device.

The execution circuit 20 is configured to store the information sent by the detection device and receive an image information request of the defective product; acquire image information of the detection image corresponding to the defective product according to the image information request; and send the acquired image information to the display terminal. The image information includes: an ID of the detection image and defect information corresponding to the detection image. The defect information includes: a defect type of the defect in the detection image and defect coordinates of the defect in the detection image.

The display terminal 40 is configured to receive the image information of the detection image corresponding to the defective product sent by the execution circuit; and display the detection image that is pre-stored corresponding to the defective product and mark the defect information corresponding to the detection image according to the image information.

During specific implementation, in the embodiment of the present disclosure, the detection device may be set as an AOI device. Moreover, it needs to be noted that functions of the AOI device may refer to the above description. Other essential components of the AOI device should be understood to have by those of ordinary skill in the art, which are not repeated here, nor should them be regarded as a limitation of the present disclosure. Of course, the present disclosure includes but not limited to this.

Exemplarily, a defect file server (DFS) may collect detection images, image information corresponding to the detection images and the like from the detection device. Moreover, an information sharing function between the detection device and the display terminal used for recheck may further be provided. During specific implementation, in the embodiment of the present disclosure, the file server may be set as the DFS. It needs to be noted that other essential components of the DFS should be understood to have by those of ordinary skill in the art, which are not repeated here, nor should them be regarded as a limitation of the present disclosure. Of course, the present disclosure includes but not limited to this.

Exemplarily, a manufacturing execution system (MES) is generally a production oriented control, management and analysis system between an enterprise resource management system at the upper level and industrial control at the lower level, which integrates all production resources (people, devices, materials, customer needs, etc.) by using the computer technology, and provides managers and operators with execution, tracking, analysis and feedback of production plans, so as to achieve production informatization, automation and productivity optimization. During specific implementation, in the embodiment of the present disclosure, the execution circuit may be set as the MES. It needs to be noted that other essential components of the MES should be understood to have by those of ordinary skill in the art, which are not repeated here, nor should them be regarded as a limitation of the present disclosure. Of course, the present disclosure includes but not limited to this.

Moreover, an MES personal computer (PC) and an MES server may be set in the MES. During specific implementation, the MES PC may be configured to receive the image information request of the defective product. For example, the MES PC may be configured to scan a bar code or QR code corresponding to the defective product to acquire the ID of the defective product. Moreover, the MES PC sends the ID of the defective product to the MES server as the image information request of the defective product, so that the MES server may find the image information of the detection image corresponding to the defective product from a database according to the ID of the defective product. The MES server sends the found image information of the detection image corresponding to the defective product to the MES PC. Afterwards, the image information of the detection image corresponding to the defective product is sent to the display terminal through data interaction between the MES PC and the display terminal.

A pattern generator (PG), commonly known as an inspection machine or a cell prober, may display images through own display screen. A user may control the PG through a touch screen or physical buttons. During specific implementation, in the embodiment of the present disclosure, the display terminal may be set as a PG device. It needs to be noted that other essential components of the PG device should be understood to have by those of ordinary skill in the art, which are not repeated here, nor should them be regarded as a limitation of the present disclosure. Of course, the present disclosure includes but not limited to this.

Figure 7:
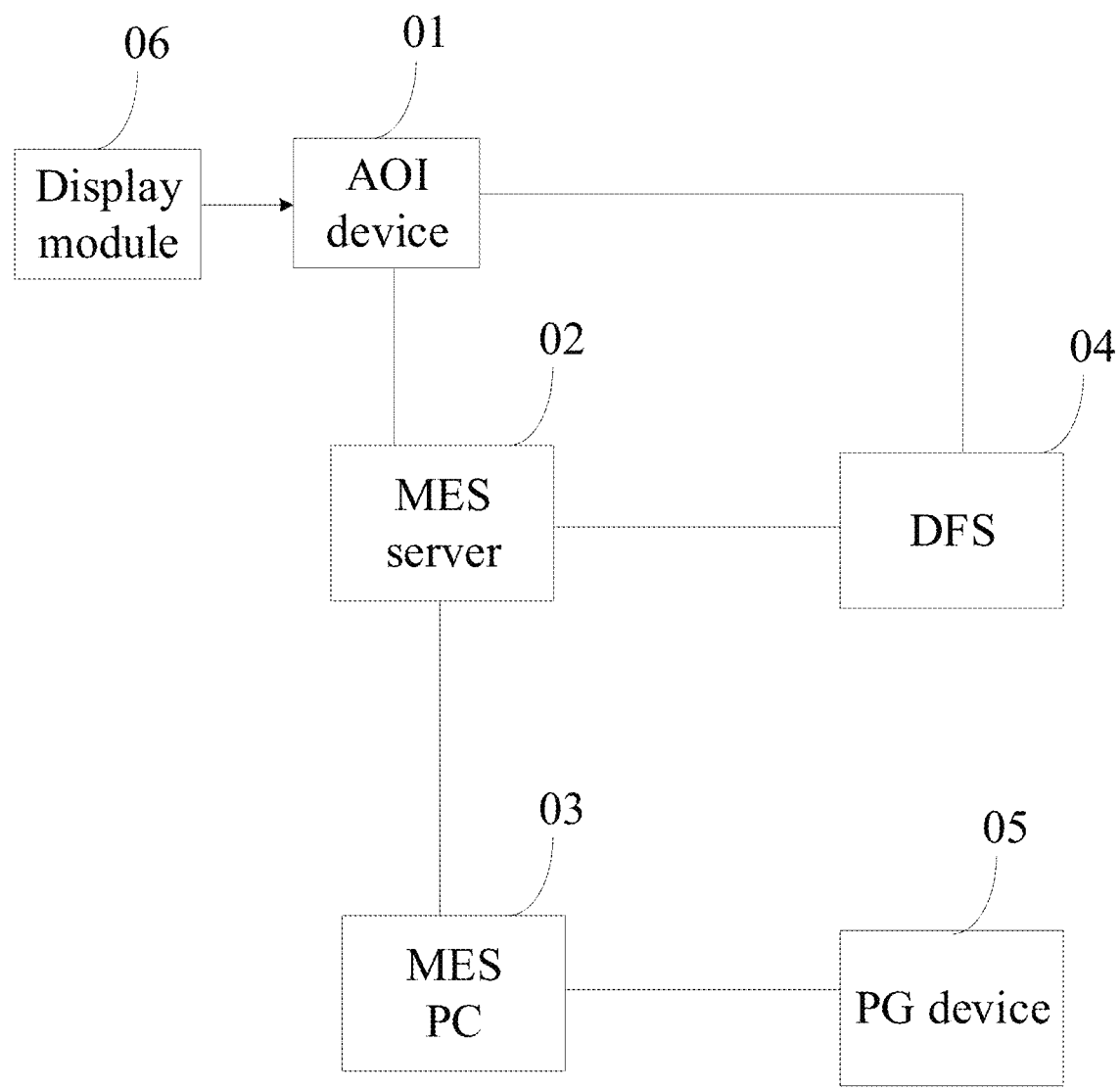
FIG. 7 is a schematic structural diagram of another detection apparatus in an embodiment of the present disclosure.

Taking a prepared product as the display module as an example, in combination with FIG. 7, a working process of the detection apparatus provided by the embodiment of the present disclosure is illustrated below through specific embodiments.

(1) An AOI device 01 drives a display module 06 to sequentially display reference images shown in FIG. 2A to FIG. 2G. When each reference image is displayed by the display module 06, displayed images are photographed to obtain images, namely 7 detection images are obtained and stored. Moreover, the AOI device 01 automatically determines the detected display module 06 as a good product or defective product through the detection images. If at least one detection image has defects, the display module 06 is determined as the defective product. Besides, the AOI device 01 and a DFS 04 may perform data interaction with each other, and the AOI device 01 sends an ID of the detection image corresponding to the determined defective product and defect information such as defect types and defect coordinates of the defects in the detection image to the DFS 04 for storage.

Moreover, the AOI device 01 and an MES server 02 may perform data interaction with each other, and the AOI device 01 sends an ID of the defective product, defect codes corresponding to the defect types, the defect coordinates, the ID of the detection image and other related information to the MES server 02 for storage.

Moreover, the MES server 02 and the DFS 04 may perform data interaction with each other. Through connection of the DFS 04 and the MES server 02, the ID of the detection image and the defect information such as the defect types and the defect coordinates of the defects in the detection image stored in the DFS 04 can be transmitted to the MES server 02 and stored in the database.

(2) The checker uses an MES PC 03 to scan a bar code or QR code corresponding to the display module 06 which is the defective product when rechecking the display module 06 which is determined as the defective product by the AOI device 01, so that the ID of the defective product is obtained. The MES PC 03 sends the ID of the defective product to the MES server 02.

(3) The MES server 02 may, according to the ID of the defective product, take IDs of the 7 detection images corresponding to the defective product, and the defect information such as the defect types and the defect coordinates of the defects in the detection images from the database. Exemplarily, the MES PC 03 may further display the taken detection images, and display the defect types in an interface of the MES PC 03.

(4) The MES server 02 determines a defect total number corresponding to each detection image according to the taken information. For example, the detection image L0 has the highest defect total number, the defect total number in the detection image LS is less than that in the detection image L0, the defect total number in the detection image LRGB is less than that in the detection image LS, the defect total number in the detection image L255 is less than that in the detection image LRGB, the defect total number in the detection image LR is less than that in the detection image L255, the defect total number in the detection image LG is less than that in the detection image LR, and the defect total number in the detection image LB is less than that in the detection image LG, so the detection image LRGB has the lowest defect total number.

(5) The MES server 02 sequentially arranges the IDs of the 7 detection images according to an order of the defect total numbers from high to low, so as to determine a display order of the 7 detection images. For example, the display order of the 7 detection images corresponding to the defective product is set as: L0, LS, LRGB, L255, LR, LG and LB.

(6) The MES server 02 sends the determined display order of the 7 detection images, the IDs of the 7 detection images, and the defect information such as the defect types and the defect coordinates of the defects in the detection images to a PG device 05.

Exemplarily, the MES server 02 will further transmit a product state corresponding to the ID of the display module to the PG device 05. For example, if the display module detected by the AOI device 01 is a good product, the product state is denoted by 01. If the display module detected by the AOI device 01 is a defective product, the product state is denoted by 05. If the display module detected by the AOI device 01 is a blank screen product, the product state is denoted by 255. Of course, the present disclosure includes but not limited to this.

Exemplarily, the MES server 02 will further transmit a total number of the defect images in the detection images having the defects corresponding to the ID of the display module to the PG device 05. For example, if the 7 detection images all have defects, the total number of the defect images is 7. If only 5 detection images in the 7 detection images have defects, the total number of the defect images is 5. Of course, the present disclosure includes but not limited to this.

Exemplarily, the MES server 02 will further transmit actual sizes of defect regions in the detection images corresponding to the ID of the display module to the PG device 05. For example, the area of the defects in the detection images may be mapped to a resolution ratio of the display module according to a proportional relation, so as to obtain the actual sizes of the defect regions.

It needs to be noted that if a certain display module with an ID is determined as a good product, the total number of the detection images is 0, and x0, y0, W0 and H0 all correspond to 0.

(7) The PG device 05 receives the display order of the 7 detection images, the IDs of the 7 detection images, and the defect information such as the defect types and the defect coordinates of the defects in the detection images sent by the MES server 02.

(8) The PG device 05 sequentially displays the detection images that are pre-stored corresponding to the defective product and marks the defect information corresponding to the detection images according to the display order.

For example, the PG device 05 may determine to display the detection image L0 firstly according to the display order.

(9) If defect types in the detection image L0 have: dot defects, black dot defects, brightness dot defects, line defects and Mura defects, since the total number of the defects is high, identification boxes may shield part of the defects, and thus the PG device 05 may select a brightness dot defect in the detection image L0 as a target defect type so as to obviously display the brightness dot defect.

(10) The PG device 05 determines identification coordinates of four vertexes of an identification box as: (x1, y1), (x1, y2), (x2, y2) and (x2, y1) according to defect coordinates (x0, y0) of the brightness dot defect in the detection image L0 and relations:

$$x1 = x0 - \frac{W0}{2}, y1 = y0 + \frac{H0}{2}, x2 = x0 + \frac{W0}{2} \text{ and } y2 = y0 - \frac{H0}{2}.$$

Moreover, under a special situation: if $$x0 - \frac{W0}{2} < 3 \text{ or } x0 < \frac{W0}{2},$$

x1 may be equal to 0, and if $$y0 - \frac{H0}{2} < 3 \text{ or } y0 < \frac{H0}{2},$$

y1 may be equal to 0. Of course, the present disclosure includes but not limited to this.

Further, in order to avoid that the identification box is too small and affects detection of the defects, the width of the identification box in a first direction is not less than the width of 200 pixel units, and the width of the identification box in a second direction is also not less than the width of 200 pixel units. It needs to be noted that in the practical application, a width range of 200 pixel units may be 15 to 20 mm. For example, the width range of 200 pixel units may be 15 mm, or 18 mm or 20 mm. Moreover, in the practical application, the size of the identification box is not less than the width of 200*200 pixel units. Taking B used as the width of 200 pixel units as an example for illustration below, if the size of the identification box is less than B*B, the identification box is displayed according to the size of B*B. If the size of the identification box is greater than B*B, the identification box is displayed according to the above relation of $$x1 = x0 - \frac{W0}{2}, y1 = y0 + \frac{H0}{2}, x2 = x0 + \frac{W0}{2} \text{ and } y2 = y0 - \frac{H0}{2}.$$

For example, a resolution ratio of the defective product is 1080*2340, and as shown in FIG. 4, an x axis coordinate range is 0 to 1080, and a y axis coordinate range is 0 to 2340, x0=840, and y0=930.

(11) A pattern of a line of an identification box to be displayed is determined according to the defect type of the brightness dot defect in the detection image L0.

For example, the defects of different defect types may be marked through identification boxes of different colors, so that the checker may visually see which defect types are the same. Alternatively, the identification boxes adopted by the defects of different defect types may be different in line shape. For example, the brightness dot defect may adopt solid lines, and the line defect may adopt dot dash lines.

Of course, the patterns of the identification boxes may preferably adopt solid line boxes, and this is simple and easy to obtain.

(11) Identification box colors with color differences, that are greater than a difference threshold, with that of the detection image L0 are selected.

For example, if the color of the detection image L0 is black, the color of the identification box may be white, or other colors different from black.

(12) It is determined that the color of the identification box corresponding to the brightness dot defect in the detection image L0 is white, and the line of the identification box is a solid line.

Figure 8:
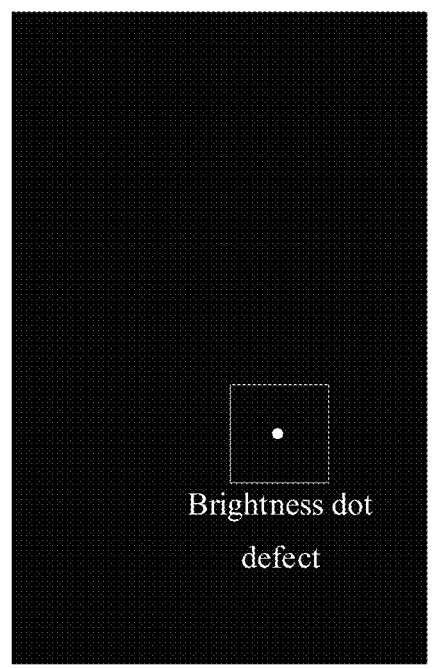
FIG. 8 is a schematic structural diagram of yet another detection image in an embodiment of the present disclosure.

(13) The identification box is displayed in the detection image L0, the position of the defect is displayed according to the defect coordinates of the brightness dot defect, and the brightness dot defect is displayed around the position of the defect. For example, as shown in FIG. 8, a white rectangular box is the identification box corresponding to the brightness dot defect, the position of a white dot is the position of the brightness dot defect in the detection image L0, and the defect is shown as the brightness dot defect around the white dot.

Figure 9:
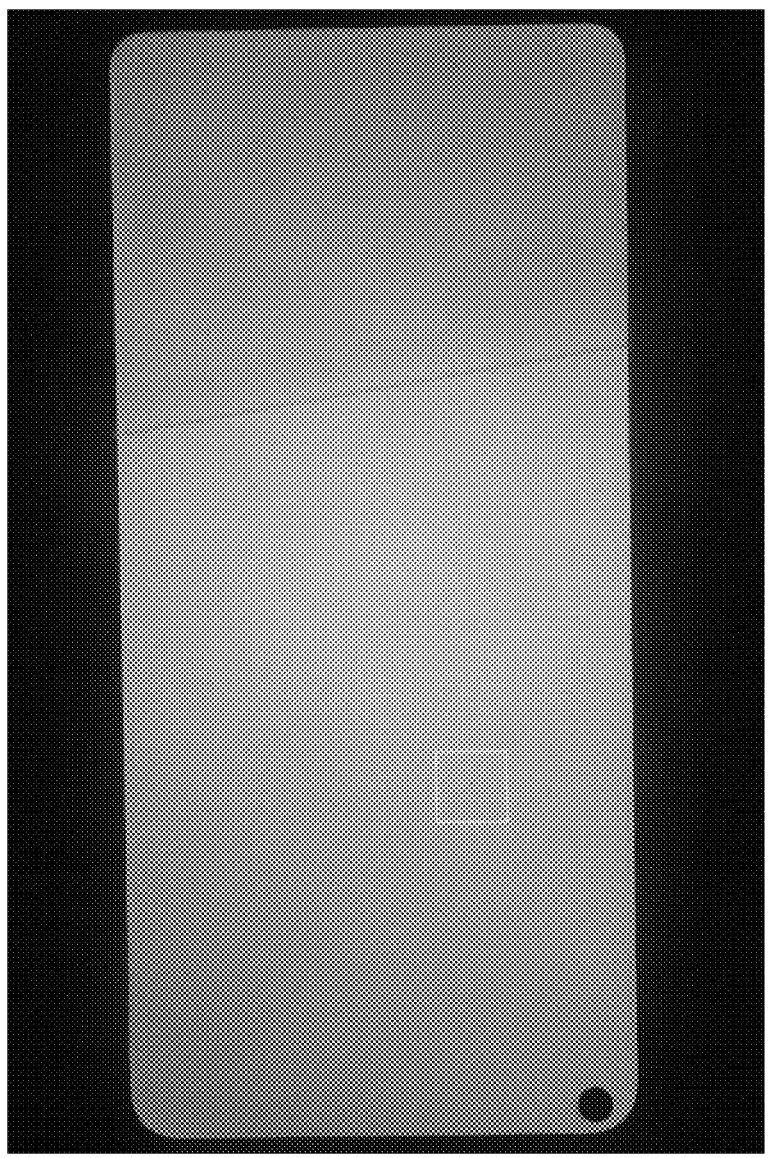
FIG. 9 is a schematic structural diagram of yet another detection image in an embodiment of the present disclosure.

(14) The next detection image may be switched to through an external keyboard, and steps (9) to (13) are repeated until the detection image LB is rechecked. Exemplarily, FIG. 9 shows an image obtained when the detection image L255 is rechecked.

It needs to be noted that when the former image is switched to the next image according to the display order, control may be performed through operation on the external keyboard or a software interface of an upper computer (e.g., the MES PC or other computers).

Apparently, those skilled in the art may perform various variations and modifications to the embodiments of the present disclosure without departing from the spirit and scope of the embodiments of the present disclosure. Therefore, if these variations and modifications to the embodiments of the present disclosure belong to the scope of the claims of the present disclosure and its equivalents, the present disclosure also intends to contain these variations and modifications.

What is claimed is:

1. A method for rechecking a defective product, comprising:
   receiving, by a display terminal, image information of at least one detection image corresponding to the defective product; wherein the image information comprises: an ID (identification) of the at least one detection image, and defect information corresponding to the at least one detection image, and the defect information comprises: a defect type of a defect in the at least one detection image, and defect coordinates of the defect in the at least one detection image; and
   according to the image information, displaying, by the display terminal, the at least one detection image that is pre-stored corresponding to the defective product and marking, by the display terminal, the defect information corresponding to the at least one detection image;
   wherein the defective product corresponds to a plurality of detection images;
   the image information further comprises: a display order of the plurality of detection images, wherein one detection image corresponds to one defect total number, and the display order is that the IDs of the plurality of detection images are sequentially arranged according to the defect total numbers from high to low; and
   the displaying the at least one detection image that is pre-stored corresponding to the defective product and marking the defect information corresponding to the at least one detection image comprises:
   according to the display order, sequentially displaying the detection images that are pre-stored corresponding to the defective product and marking the defect information corresponding to the detection images.

2. The method for rechecking the defective product according to claim 1, wherein the marking the defect information corresponding to the detection images, comprises:
   determining identification coordinates of identification boxes to be displayed according to defect coordinates of defects in the detection images;
   determining identification box types of the identification boxes to be displayed according to the detection images and the defect types; and
   displaying the identification boxes and positions of the defects on the detection images according to the defect coordinates, the identification coordinates and the identification box types, wherein the identification boxes surround the positions of the defects.

3. The method for rechecking the defective product according to claim 2, further comprises:
   in the condition that displaying the identification boxes and the positions of the defects on the detection images according to the defect coordinates, the identification coordinates and the identification box types, displaying the defect types of the defects around the positions of the defects according to the defect types.

4. The method for rechecking the defective product according to claim 3, wherein the defect information also comprises: an initial width W0 and an initial height H0 of each of the defects, wherein the initial width is a maximum distance of a region of the defect in a display image of the defective product in a first direction, the initial height is a maximum distance of the region of the defect in the display image of the defective product in a second direction, and the first direction and the second direction are different; and
   the identification boxes are rectangular, identification coordinates of four vertexes of one of the identification boxes are: (x1, y1), (x1, y2), (x2, y2) and (x2, y1), and the defect coordinates are (x0, y0), wherein $$x1 = x0 - \frac{W0}{2}, y1 = y0 + \frac{H0}{2}, x2 = x0 + \frac{W0}{2} \text{ and } y2 = y0 - \frac{H0}{2}.$$

5. The method for rechecking the defective product according to claim 3, wherein the determining the identification box types of the identification boxes according to the detection images and the defect types, comprises:
   determining patterns of lines of the identification boxes to be displayed according to the defect types;
   selecting identification box colors with color differences, that are greater than a difference threshold, with that of the detection images; and
   using the patterns of the lines and the identification box colors as the identification box types.

6. The method for rechecking the defective product according to claim 3, wherein the plurality of detection images corresponding to the defective product are different in gray scale.

7. The method for rechecking the defective product according to claim 2, wherein the defect information also comprises: an initial width W0 and an initial height H0 of each of the defects, wherein the initial width is a maximum distance of a region of the defect in a display image of the defective product in a first direction, the initial height is a maximum distance of the region of the defect in the display image of the defective product in a second direction, and the first direction and the second direction are different; and
   the identification boxes are rectangular, identification coordinates of four vertexes of one of the identification boxes are: (x1, y1), (x1, y2), (x2, y2) and (x2, y1), and the defect coordinates are (x0, y0), wherein $$x1 = x0 - \frac{W0}{2}, y1 = y0 + \frac{H0}{2}, x2 = x0 + \frac{W0}{2} \text{ and } y2 = y0 - \frac{H0}{2}.$$

8. The method for rechecking the defective product according to claim 7, wherein the plurality of detection images corresponding to the defective product are different in gray scale.

9. The method for rechecking the defective product according to claim 2, wherein the determining the identification box types of the identification boxes according to the detection images and the defect types, comprises:
   determining patterns of lines of the identification boxes to be displayed according to the defect types;
   selecting identification box colors with color differences, that are greater than a difference threshold, with that of the detection images; and
   using the patterns of the lines and the identification box colors as the identification box types.

10. The method for rechecking the defective product according to claim 9, wherein the plurality of detection images corresponding to the defective product are different in gray scale.

11. The method for rechecking the defective product according to claim 2, wherein before the displaying the identification boxes and the positions of the defects on the detection images, the method further comprises: determining a target defect type in the defect types of the defects in the detection images; and the displaying the identification boxes and the positions of the defects on the detection images comprises: displaying an identification box corresponding to the target defect type and a position of the target defect type on each of the detection images.

12. The method for rechecking the defective product according to claim 2, wherein the plurality of detection images corresponding to the defective product are different in gray scale.

13. The method for rechecking the defective product according to claim 1, wherein the plurality of detection images corresponding to the defective product are different in gray scale.

14. A display terminal, comprising a display, a first memory, a first processor and a computer program stored on the first memory and capable of running on the first processor, wherein when executing the computer program, the first processor implements the method for rechecking the defective product according to claim 1.

15. A nontransitory computer readable storage medium, on which a computer program is stored, wherein when executed by a processor, the computer program implements the method for rechecking the defective product according to claim 1.

16. A method for rechecking a defective product, comprising:

receiving, by an execution circuit, an image information request of the defective product;

acquiring, by the execution circuit, image information of at least one detection image corresponding to the defective product according to the image information request, wherein the image information comprises: an ID (identification) of the at least one detection image and defect information corresponding to the at least one detection image, and the defect information comprises: a defect type of a defect in the at least one detection image and defect coordinates of the defect in the at least one detection image; and sending the acquired image information to a display terminal;

wherein the defective product correspond to a plurality of detection images; and the acquiring, by the execution circuit, the image information of the plurality of detection images corresponding to the defective product according to the image information request, comprises:

taking, by the execution circuit, image information of the plurality of detection images corresponding to the defective product from a database according to the image information request;

determining, by the execution circuit, a defect total number corresponding to each of the plurality of detection images;

sequentially arranging, by the execution circuit, IDs of the plurality of detection images according to an order of the defect total numbers from high to low so as to determine a display order of the plurality of detection images; and sending the image information comprising the display order to the display terminal.

17. An execution circuit, comprising a second memory, a second processor and a computer program stored on the second memory and capable of running on the second processor, wherein when executing the program, the second processor implements the method for rechecking the defective product according to claim 16.

18. A detection apparatus, comprising: a detection device, an execution circuit, a file server and a display terminal, wherein the detection device is connected with the execution circuit and the file server; and the detection device is configured to perform image detection on a product; transmit a detected detection image and image-related information to the file server for storage, and transmit an ID of the product, a defect code, position information of a defect and an ID of the detection image to the execution circuit for storage;

the file server is configured to store the information sent by the detection device;

the execution circuit is configured to store the information sent by the detection device, receive an image information request of a defective product, acquire image information of a detection image corresponding to the defective product according to the image information request, and send the acquired image information to the display terminal; wherein the image information comprises: an ID of the detection image and defect information corresponding to the detection image; and the display terminal is configured to receive the image information of the detection image corresponding to the defective product sent by the execution circuit; and display the detection image that is pre-stored corresponding to the defective product and mark the defect information corresponding to the detection image according to the image information;

wherein the defective product corresponds to a plurality of detection images;

the image information further comprises: a display order of the plurality of detection images, wherein one detection image corresponds to one defect total number, and the display order is that the IDs of the plurality of detection images are sequentially arranged according to the defect total numbers from high to low; and the displaying the at least one detection image that is pre-stored corresponding to the defective product and marking the defect information corresponding to the at least one detection image comprises:

according to the display order, sequentially displaying the detection images that are pre-stored corresponding to the defective product and marking the defect information corresponding to the detection images.

* * * * *